US012169018B1

(12) United States Patent
Nahrwold et al.

(10) Patent No.: US 12,169,018 B1
(45) Date of Patent: Dec. 17, 2024

(54) GEAR COOLING SYSTEM

(71) Applicant: Dana Automotive Systems Group, LLC, Maumee, OH (US)

(72) Inventors: Thomas L. Nahrwold, Napoleon, OH (US); Dnyanesh Katre, Ypsilanti, MI (US); Nicholas Billmaier, Sylvania, OH (US)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 0 days.

(21) Appl. No.: 18/479,296

(22) Filed: Oct. 2, 2023

(51) Int. Cl.
*F16H 57/04* (2010.01)

(52) U.S. Cl.
CPC ......... *F16H 57/046* (2013.01); *F16H 57/043* (2013.01)

(58) Field of Classification Search
CPC .............................. F16H 57/046; F16H 57/043
See application file for complete search history.

(56) References Cited

U.S. PATENT DOCUMENTS

| | | | | |
|---|---|---|---|---|
| 3,637,049 | A * | 1/1972 | Butterfield | F16H 57/0434 184/6.12 |
| 3,785,458 | A * | 1/1974 | Caldwell | B60R 17/00 184/6.12 |
| 4,687,411 | A * | 8/1987 | Maeda | F16C 35/02 384/538 |
| 10,844,947 | B2 * | 11/2020 | Schoenfeld | F16H 57/0495 |
| 11,808,309 | B2 * | 11/2023 | Lewis | F01D 25/18 |
| 2003/0232683 | A1 * | 12/2003 | Teraoka | F16H 48/34 475/231 |
| 2005/0205359 | A1 * | 9/2005 | Miller | F16H 57/043 184/6.12 |
| 2010/0007151 | A1 * | 1/2010 | Ciszak | F16H 57/043 184/6.12 |
| 2018/0283527 | A1 * | 10/2018 | Sasaki | F16H 57/0471 |
| 2020/0332883 | A1 * | 10/2020 | Fujii | F16H 57/0471 |
| 2021/0252958 | A1 * | 8/2021 | Engerman | F16H 57/042 |
| 2021/0317907 | A1 * | 10/2021 | Paoff | F16H 3/091 |
| 2023/0038989 | A1 * | 2/2023 | Walters | F16H 57/046 |

FOREIGN PATENT DOCUMENTS

| | | |
|---|---|---|
| CN | 115199735 A | 10/2022 |
| CN | 112049923 B | 11/2022 |
| DE | 102011011242 A1 | 8/2012 |
| JP | S57137767 A | 8/1982 |
| WO | 2014191646 A1 | 12/2014 |

OTHER PUBLICATIONS

CN112049923—Machine Translation (Year: 2022).*

* cited by examiner

*Primary Examiner* — Michael A Riegelman
(74) *Attorney, Agent, or Firm* — McCoy Russell LLP

(57) ABSTRACT

Systems and methods for gear cooling. In one example, the gear cooling system includes a spray tube positioned within a central opening that is included in a first gear. The spray tube includes an oil outlet, the oil outlet is positioned within a smaller diameter section of the central opening, the smaller diameter section is axially offset from an outer toothed portion of the first gear, and the central opening includes a larger diameter section that is positioned interior to the outer toothed portion of the first gear.

17 Claims, 3 Drawing Sheets

GEAR COOLING SYSTEM

TECHNICAL FIELD

The present description relates generally to a gear cooling system. More specifically, the present disclosure relates to a gear cooling system which routes oil internally through a gear.

BACKGROUND AND SUMMARY

Gears in electric powertrains, such as electric axles, and other energy dense applications can experience elevated heat levels due to the mechanical stresses and friction generated during operation. Attempts have been made to cool gears via external oil lubrication and air cooling, in different systems. However, these cooling arrangements may not meet cooling demands in certain systems. Further, the inventors have recognized difficulties in designing a rotational system to withstand high rotational forces and velocities while effectively distributing oil and cooling gears in the system.

The issues described above may be addressed by a gear cooling system. In one example, the gear cooling system includes a spray tube that is positioned within a central opening which is included in a gear. The spray tube includes an oil outlet, and the oil outlet is positioned within a smaller diameter section of the central opening. Further, the smaller diameter section is axially offset from an outer toothed portion of the gear, and the central opening includes a larger diameter section that is positioned interior to the outer toothed portion of the gear. During system operation, oil flows from the spray tube into the smaller diameter section and centrifugal forces cause the oil to flow from the smaller diameter section to the larger diameter section. In this way, the gear is effectively internally cooled, thereby increasing the gear's longevity by decreasing the chance of gear degradation which is caused by high temperatures.

Further, in one example, the smaller diameter section may include multiple oil channels formed as recesses in an interior surface. These oil channels allow a greater amount of oil to flow through the central opening, thereby increasing gear cooling.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to a gear cooling system for a vehicle or other suitable operating environment with gear cooling demands. The vehicle, such as the vehicle shown by FIG. 1, may include a gearbox with one or more shafts and one or more gears. The gearbox includes a gear cooling system, such as the gear cooling system shown by FIG. 2. An oil source may provide oil to a spray tube which may in turn provide oil to a central opening in a shaft and a gear. During gear rotation, the oil flows through sections of the central opening and exits the central opening, before being returned to the oil source. In this way, the gear is internally cooled via the oil. In some examples, the gear cooing system may include one or more scroll channels, such as the scroll channels shown by FIG. 3. These scroll channels allow oil to more quickly flow through the central opening of the gear cooling system.

Figure 1:
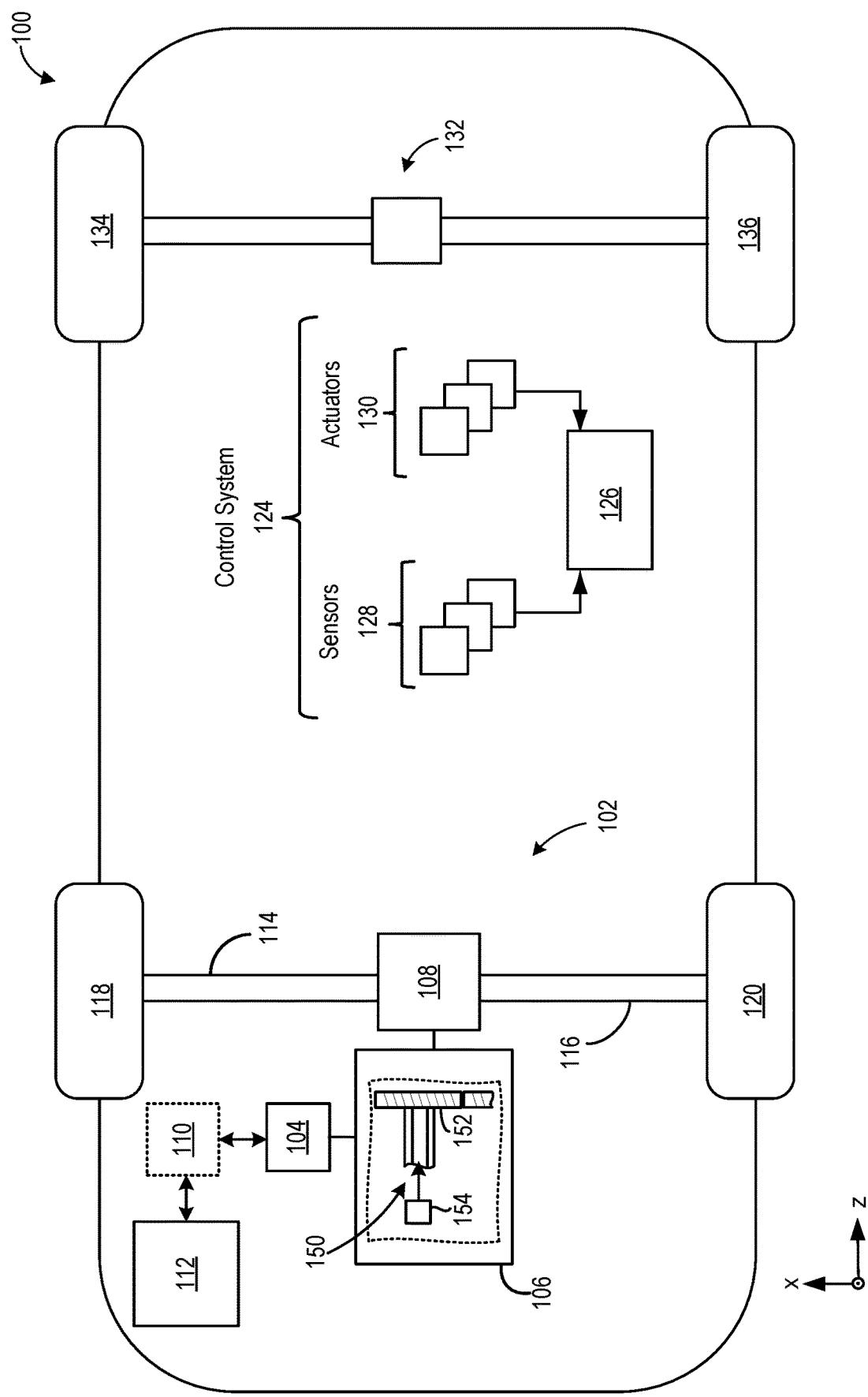
FIG. 1 shows an illustration of a gear cooling system in an electric axle of a vehicle.

Referring to FIG. 1, a vehicle 100 is depicted. It will be appreciated that the vehicle 100 is shown in FIG. 1 for illustrative purposes and is a non-limiting example of how a vehicle may be configured. Other examples may include variations in arrangements and positioning of vehicle components depicted in FIG. 1, as well as additional components not shown in FIG. 1. In the illustrated example, the vehicle 100 is an all-electric vehicle (EV) such as a battery electric vehicle (BEV). In other examples, the vehicle 100 may be a hybrid electric vehicle (HEV) with an internal combustion engine. Further, in some examples, the vehicle 100 may be powered solely by an internal combustion engine. In such an example, the engine may be rotationally coupled to a gearbox 106, which is described in greater detail herein. The vehicle 100 may be a passenger vehicle, a commercial vehicle, an on-highway vehicle, or an off-highway vehicle, in different examples.

In the illustrated example, the vehicle 100 includes an electric axle 102. In some examples, the electric axle 102 may be a front or rear axle. The electric axle 102 may include a traction motor 104, the gearbox 106, and a differential 108. As such, the traction motor 104, the gearbox 106, and the differential 108 may be enclosed within a housing. An inverter 110 may further be incorporated into the electric axle's enclosure. However, in other examples, the vehicle may be designed with an electric drive that is spaced away but provides mechanical power to the axle 102.

The traction motor 104 may include a rotor that electromagnetically interacts with a stator to drive rotation of a rotor shaft that is included in the rotor. The traction motor 104 may further include a housing, bearings coupled to the rotor shaft, and the like.

The traction motor 104 may be a multi-phase alternating current (AC) motor, and as such, in some examples, the traction motor may be electrically coupled to the inverter 110 via an electrical connection (e.g., multiphase bus bars, wires, and the like). The inverter 110 is designed to convert direct current (DC) power to AC power and vice versa. In other examples, the inverter 110 may be omitted from the vehicle 100 and the traction motor may be a DC motor.

The inverter 110 may be electrically coupled to an energy storage device 112 (e.g., traction batteries, capacitors, combinations thereof, and the like). A DC electrical connection may be formed between the inverter 110 and the energy storage device 112.

In some examples, the traction motor 104 may be a motor-generator, with a capacity to convert electrical energy into mechanical energy and vice versa. As such, the traction motor 104 may be electrically coupled to the energy storage device 112 (e.g., via the inverter 110) to both draw power from the energy storage device and to generate electrical energy to be stored in the energy storage device. Further, in the case of the vehicle 100 being an HEV vehicle, the energy storage device 112 may be charged by an internal combustion engine.

The traction motor 104 is rotationally coupled (e.g., directly rotationally coupled) to a shaft in the gearbox 106. The rotational coupling between the traction motor 104 and the gearbox 106 may be achieved via a splined interface, a sleeve, bolted flanges, combinations thereof, and the like. As such, the gearbox 106 is configured to receive torque input from the traction motor 104. In some examples, the gearbox 106 may be a single-speed gearbox. In other examples, the gearbox 106 may be a multi-speed gearbox with clutches for shifting between different active gear ratios.

The gearbox 106 includes a housing and gears that may rotate and mesh with one another to transfer mechanical (e.g., rotational energy). During gearbox operation heat is generated in the gearbox.

To remove heat from the gearbox 106, a gear cooling system 150 is provided. It will be appreciated that the gear cooling system 150 and the other gear cooling systems described herein may be used in other systems with gear cooling demands. For instance, the gear cooling system(s) may be used in industrial machinery, agricultural equipment, etc. The gear cooling system 150 routes oil internally through a gear 152 to remove heat therefrom. The gear cooling system therefore increases gearbox longevity by reducing the chance of gear degradation. The gear cooling system 150 may therefore specifically be an internal gear cooling system. The gear cooling system 150 receives oil from an oil source 154. The oil source 154 may include a pump in an oil reservoir (e.g., a sump), in one specific example. To elaborate, the sump may be included in a lower portion of an enclosure of the electric axle. However, other suitable oil sources may be used in other examples. For instance, the oil source may be a gravity driven system.

The gearbox 106 may transfer torque to axle shafts 114, 116 via the differential 108. The gearbox 106 may be rotationally coupled to the differential 108 via shaft(s), gear(s), joint(s), combinations thereof, and the like.

As such, the differential 108 may be rotationally coupled the gearbox 106 to output torque to the axle shafts 114, 116. In this way, the gearbox 106 may transmit torque output from the traction motor 104 to drive wheels 118, 120 via the differential 108 and the axle shafts 114, 116, respectively, to enable vehicle motion.

The vehicle 100 may additionally include an axle 132 and wheels 134, 136. The axle 132 may be a non-driven axle, in one example. However, in other examples the axle 132 may be a driven axle that may receive motive power from an electric drive and/or an internal combustion engine, for instance. To elaborate, in one specific example, the axle 132 may be an electric axle. In this way, the vehicle may exhibit all-wheel drive capabilities, in certain embodiments.

The vehicle 100 may further include a control system 124 that includes a controller 126, sensors 128, and actuators 130. The controller 126 may be a microcomputer, including elements such as a microprocessor unit, input/output ports, an electronic storage medium for executable programs and calibration values, e.g., a read-only memory chip, random access memory, keep alive memory, and a data bus. In one example, the controller 126 may be a powertrain control module (PCM).

The controller 126 may receive various signals from the sensors 128 that are coupled to various regions of the vehicle 100. For example, the sensors 128 may include position sensors which are coupled to the gearbox 106, engine sensors for monitoring engine speed, temperature, air mass flow, etc., sensors coupled to the energy storage device 112 for measuring a battery state of charge and temperature, and sensors coupled to the traction motor 104 for monitoring a status of the traction motor. Upon receiving signals from one or more of the sensors 128 of FIG. 1, the controller 126 processes the received signals, and employs one or more of the actuators 130 of the vehicle 100 to adjust motor and gearbox operations based on the received signals as well as instructions stored in memory of the controller 126.

Figure 2:
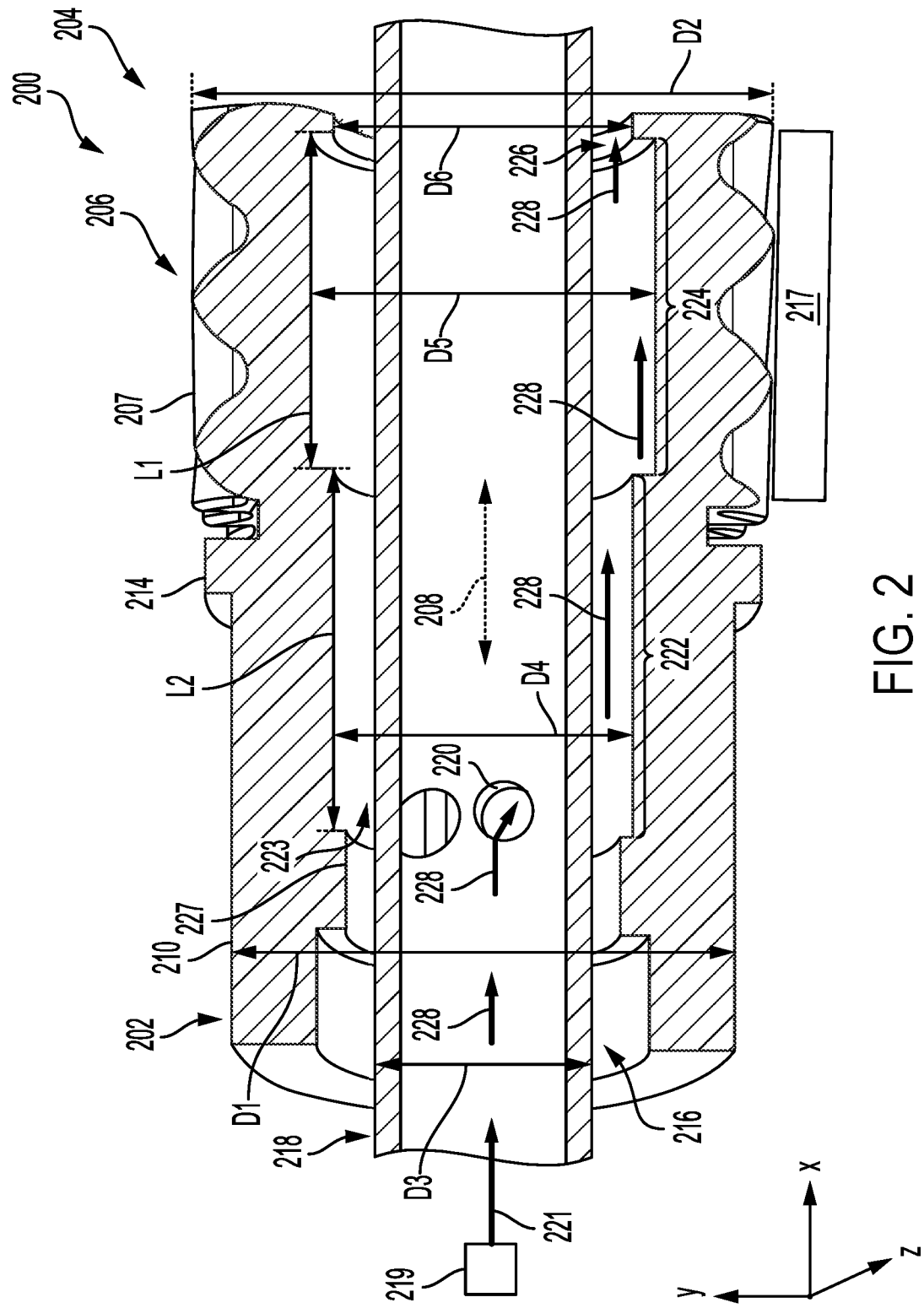
FIG. 2 shows a cross-sectional view of an example of a gear cooling system that includes a spray tube positioned within a central opening of a gear.
Figure 3:
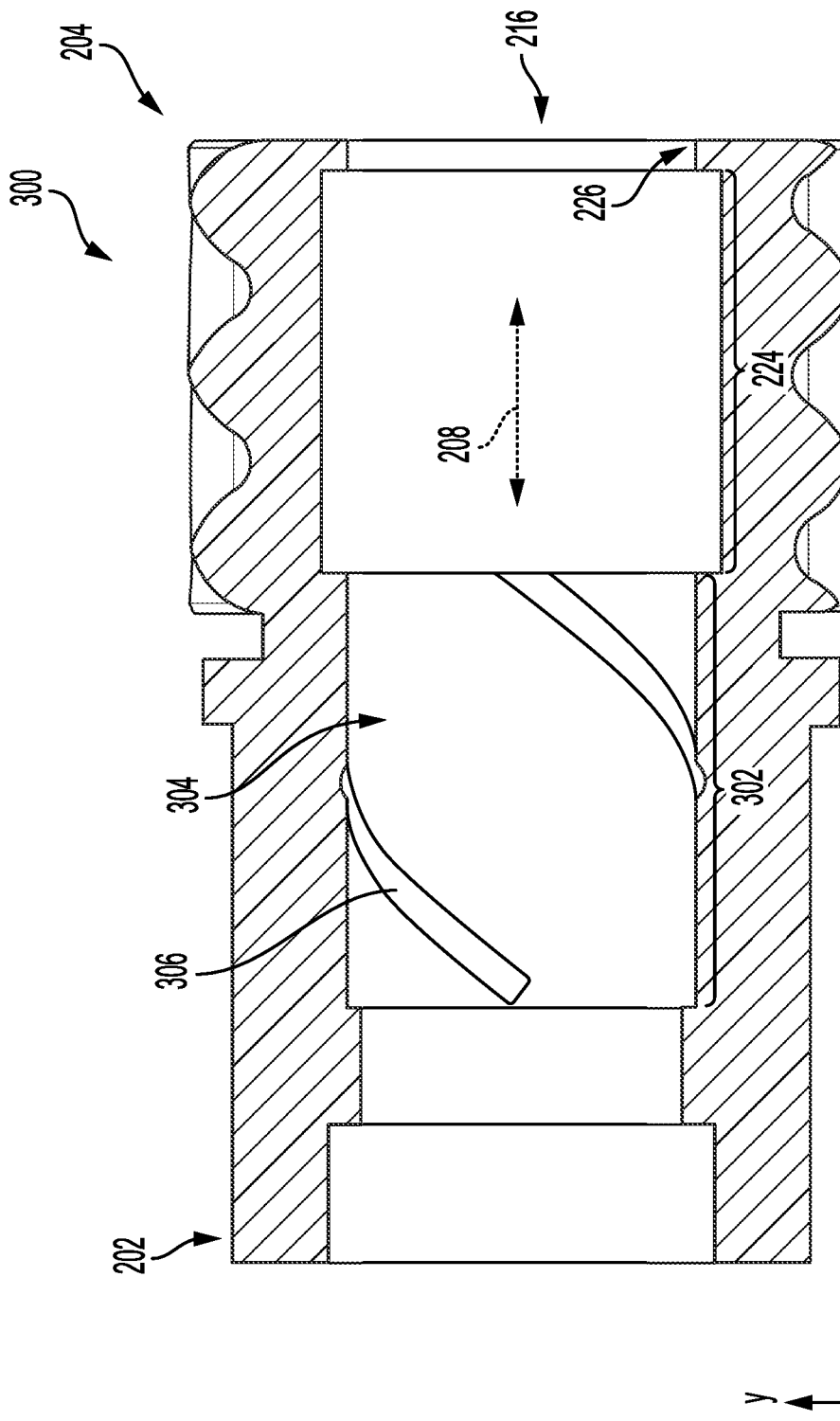
FIG. 3 shows a gear cooling system with scroll channels in a central opening of a gear.

FIGS. 1-3 include a Cartesian coordinate system to orient the views. The y-axis may be a vertical axis (e.g., parallel to a gravitational axis), the x-axis may be a longitudinal axis (e.g., horizontal axis), and/or the z-axis may be a lateral axis, in one example. However, the axes may have other orientations, in other examples.

FIG. 2 shows a gear cooling system 200 for a gear 204 which includes an extension 202. In some examples, the gear cooling system 200 may be positioned within an electric axle, such as the electric axle 102 of FIG. 1. In other examples, the gear cooling system may be positioned within an electric powertrain that includes an electric drive which is spaced away from but provides power to the drive axle, or another system that includes gears, as previously indicated.

The gear 204 includes an outer toothed portion 206 and the extension 202. To elaborate, the extension 202, in the illustrated example, does not include teeth. However, other gear profiles have been contemplated.

In some examples, the gear 204 and the extension 202 may be manufactured as a monolithic component. In other examples, the gear 204 may be situated on the extension 202 and may be coupled to the shaft via welding, an interference fit, combinations thereof, and the like, in some examples. The gear 204 includes the outer toothed portion 206 with gear teeth 207. The gear teeth 207 are helical gear teeth in the illustrated example. However, other suitable types of gear teeth may be used in other examples, such as straight cut teeth.

The extension 202 has an outer diameter D1. The gear 204 has an outer diameter D2. The outer diameter D2 of the gear 204 may be larger than the outer diameter D1 of the extension 202.

A ridge 214 may extend outward (e.g., away from the rotational axis 208) from the outer surface 210 of the extension 202. The ridge 214 may be positioned proximate to, but spaced away from, the outer toothed portion 206 of the gear 204.

The gear cooling system 200 includes a central opening 216 positioned within the extension 202 and the gear 204. The central opening 216 and the extension 202 may extend along the rotational axis 208. Further, the boundary of the central opening may include inner surfaces of the extension.

Further, a spray tube 218 may be positioned within the central opening 216. The spray tube 218 may be cylindrical, with a longitudinal axis parallel to the rotational axis 208 of the gear cooling system 200. However, other spray tube profiles have been envisioned. In the illustrated example, the spray tube 218 receives oil from an oil source 219 which is schematically depicted in FIG. 2. Arrow 221 denotes the flow of oil from the oil source 219 to the spray tube 218 which may be accomplished via conduits, valves, and the like. The oil source 219 may be a pump which is positioned in a sump of an electric axle, in one example. To elaborate, the oil pump may be included in an oil circuit which branches to provide oil to the spray tube and in another electric axle branch provides oil to other devices in the axle. In this way, the electric axle's space efficiency may be increased, if desired. For instance, the oil circuit may provide oil to bearing(s), clutch(es), and/or other components with oil demands via nozzles, conduits, and the like. In other examples, the oil source and the spray tube described herein may be an oil circuit that is independent from another oil circuit in the electric axle which provides oil to components with oil demands such as clutches, bearings, and the like. However, other suitable oil sources have been contemplated. The spray tube 218 may be relatively stationary while the gear 204 rotates, in one example. However, in other examples, the spray tube 218 and the gear 204 may co-rotate.

An outer diameter D3 of the spray tube 218 is smaller than inner diameters of the extension 202 and the gear 204, such that there is a channel 223 between the spray tube and the inner surfaces of the shaft and gear. The spray tube 218 includes an oil outlet 220 which allows oil to exit the spray tube and enter the central opening 216. Oil in the spray tube may be pressurized. Heat is transferred to the oil in the central opening 216 from the gear 204 which meshes with another gear 217, which is schematically depicted in FIG. 2.

The central opening 216 include a first smaller diameter section 222 and a larger diameter section 224. The central opening 216 may further include a second smaller diameter section 226, where the larger diameter section is positioned intermediate the first smaller diameter section and the second smaller diameter section. In the illustrated example, the first smaller diameter section 222 is axially offset from the outer toothed portion 206, relative to the rotational axis 208. However, the first smaller diameter section may be positioned in another suitable location in the gear in other examples. The oil outlet 220 is positioned within the first smaller diameter section 222 such that oil is sprayed from the spray tube 218, through the oil outlet, and into the first smaller diameter section, in the illustrated example.

The larger diameter section 224 may be positioned adjacent to the first smaller diameter section 222 and interior to the outer toothed portion 206 of the gear 204. As such, the first smaller diameter section 222 and the larger diameter section 224 may be fluidly coupled together, and oil may flow from the first smaller diameter section directly into the larger diameter section.

The second smaller diameter section 226 may be axially offset from the outer toothed portion 206 on a second side, relative to the rotational axis 208. Further, the second smaller diameter section 226 may be positioned adjacent to the larger diameter section 224. In this way, oil may flow from the larger diameter section 224 directly into the second smaller diameter section 226.

The first smaller diameter section 222 has a diameter D4, which is larger than the outer diameter D3 of the spray tube 218. The larger diameter section 224 has a diameter D5, which is larger than the diameter D4 of the first smaller diameter section 222. The larger diameter section 224 may have a constant diameter across the entire axial length of the larger diameter section, relative to the rotational axis 208.

The diameter D4 of the first smaller diameter section 222 may be constant along the axial length of the first smaller diameter section. The diameter D5 of the larger diameter section 224 may additionally be constant along the axial length of the larger diameter section. Further, the axial length L1 of the larger diameter section 224 may be greater than the axial length L2 of the first smaller diameter section 222. In this way, desired oil flow dynamics are achieved in the channel 223 to increase gear cooling. However, other contours of the central opening 216 have been contemplated.

As the gear 204 rotates, oil within the central opening 216 is pushed outwards (e.g., into the inner surface of the extension 202) by centrifugal forces. As such, the centrifugal forces cause the oil to spread out against the inner surface of the extension 202. Due to the variance in diameters, oil flows over the interface between the first smaller diameter section 222 and the larger diameter section 224 and into the larger diameter section. Further, an internal ridge 227 may allow an increased amount of oil to be retained in the first smaller diameter section 222. As such, oil may passively move from the first smaller diameter section 222 to the larger diameter section 224 via the rotation of the extension 202. In this way, a space efficient oil cooling arrangement is formed which may have less complexity than external gear cooling systems.

The second smaller diameter section 226 may have a diameter D6, which is smaller than the diameter D5 of the larger diameter section 224 and may be larger than the diameter D4 of the first smaller diameter section 222. The diameter D6 of the second smaller diameter section 226 being smaller than the diameter D5 of the larger diameter section 224 causes the oil to build up in the larger diameter section before the oil can move into the second smaller diameter section. For example, the second smaller diameter section 226 may create a wall that forces oil to build up (e.g., pool) in a section of the central opening that is positioned interior to the outer toothed portion 206 of the gear 204. As oil builds up (e.g., pools) within the larger diameter section 224, more heat may be transferred out of the gear 204 and into the oil, increasing an ability of the gear cooling system 200 to cool the gear 204. Further, pooled oil may flow from the larger diameter section 224 into the second smaller diameter section 226 because the diameter D6 of the second smaller diameter section is larger than the diameter D4 of the first smaller diameter section. As such, centrifugal forces generated by rotation of the extension 202 and the gear 204 push oil into the second smaller diameter section 226 before the oil builds up enough to re-enter the first smaller diameter section 222.

Arrows 228 denote a general direction of oil flow through the gear cooling system 200, in the illustrated example. Oil, which is provided by the oil source 219 as denoted by arrow 221, travels through the spray tube 218 towards the oil outlet 220. A portion of the oil exits the spray tube 218 via the oil outlet 220 and enters the first smaller diameter section 222 of the central opening 216. Centrifugal forces generated by rotation of the gear 204 push oil from the first smaller diameter section 222 to the larger diameter section 224, as denoted by arrows 228. Once oil has built up in the larger diameter section 224, a portion of the oil in the larger diameter section flows into the second smaller diameter section 226. Oil then exits the second smaller diameter section 226.

After oil exits the second smaller diameter section 226, the oil may be recirculated (e.g., via a sump and a pump) and once again provided to the central opening 216 via the spray tube 218. In some examples, the gear cooling system 200 may provide oil to other components in the gearbox. To expound, the oil exiting from the gear may be routed to an oil sump and reused for cooling and lubrication or directly routed to other gear sets, for instance.

FIG. 3 shows a gear cooling system 300, which has some similarities with regard to the gear cooling system 200 of FIG. 2. As such, overlapping components of the gear cooling system 300 and the gear cooling system 200 are similarly numbered, and description of overlapping components is omitted for brevity. For example, the gear cooling system 300 includes the gear 204 with the extension 202, the central opening 216, the larger diameter section 224, and the second smaller diameter section 226. It will be understood, that the gear cooling system 300 may further include a spray tube (e.g., the spray tube 218 shown in FIG. 2) positioned within the central opening 216 and including an oil outlet that opens into a first smaller diameter section 302. However, the spray tube has been omitted from the view of the gear cooling system 300 shown in FIG. 3 to reveal the contours of the sections of the central opening 216.

The central opening 216 of the gear cooling system 300 in the illustrated example includes the first smaller diameter section 302, the larger diameter section 224, and the second smaller diameter section 226, where the larger diameter section is positioned intermediate the first smaller diameter section and the second smaller diameter section. The first smaller diameter section 302 may be axially offset from the gear 204 on a first side, relative to the rotational axis 208.

As illustrated in FIG. 3, an inner surface 304 of the first smaller diameter section 302 may include channels 306 which are contoured to guide oil towards the larger diameter section 224 as the extension 202 rotates. To elaborate, the channels 306 may be formed with a spiral shape. As such, the channels 306 allow a greater amount of oil to flow between the first smaller diameter section 302 and the larger diameter section 224, further increasing gear cooling.

FIGS. 1-3 provide for a method for operation of a gear cooling system. The method includes flowing oil from an oil source to a spray tube. For instance, a pump which may be positioned in an oil reservoir (e.g., an oil sump) may drive the flow of oil from the reservoir to the spray tube. The method may further include rotating the gear in which the spray tube is positioned. Rotation of the gear passively drives the flow of oil through the gear's central opening, thereby cooling the gear. Consequently, gearbox performance is increased.

FIGS. 2-3 are drawn approximately to scale, aside from the schematically depicted components. However, the components may have alternate relative dimensions, in other embodiments.

FIGS. 1-3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The invention will be further described in the following paragraphs. In one aspect, a gear cooling system is provided that includes a spray tube positioned within a central opening that is included in a first gear, wherein the spray tube includes an oil outlet, the oil outlet is positioned within a first smaller diameter section of the central opening, the first smaller diameter section is axially offset from an outer toothed portion of the first gear, and the central opening includes a larger diameter section that is positioned interior to the outer toothed portion of the first gear.

In another aspect, a method is provided for operation of a gear cooling system that includes flowing oil to a spray tube from an oil source and rotating a gear. The gear cooling system includes the spray tube positioned within a central opening of the gear and including an oil outlet, wherein the oil outlet is positioned within a first smaller diameter section of the central opening, the first smaller diameter section is axially offset from an outer toothed portion of the gear, and the central opening includes a larger diameter section that is positioned interior to the outer toothed portion of the gear.

In yet another aspect, an internal gear cooling system is provided that includes a spray tube positioned within a central opening in a gear, wherein the spray tube includes an oil outlet, the oil outlet is positioned within a first smaller diameter section of the central opening, the first smaller diameter section is axially offset from an outer toothed portion of the gear, the central opening includes a larger diameter section that is positioned interior to the outer toothed portion of the gear, the central opening further includes a second smaller diameter section that is positioned at an axial end of the gear and interior to the outer toothed portion of the gear, and oil sequentially flows through the first smaller diameter section, the larger diameter section, and the second smaller diameter section.

In any of the aspects or combinations of the aspects, the central opening may further include a second smaller diameter section that is positioned at an axial end of the first gear and interior to the outer toothed portion of the first gear.

In any of the aspects of combinations of the aspects, a diameter of the second smaller diameter section may be greater than a diameter of the first smaller diameter section.

In any of the aspects of combinations of the aspects, the spray tube may be in fluidic communication with an oil source.

In any of the aspects of combinations of the aspects, the oil source may be an oil pump positioned in a sump of an electric drive.

In any of the aspects of combinations of the aspects, a diameter of the first smaller diameter section may be constant along its axial length.

In any of the aspects of combinations of the aspects, an axial length of the larger diameter section may be greater than an axial length of the first smaller diameter section.

In any of the aspects of combinations of the aspects, an axial length of the spray tube may be larger than an axial length of the first gear.

In any of the aspects of combinations of the aspects, a diameter of the larger diameter section may be constant along its axial length.

In any of the aspects of combinations of the aspects, the outer toothed portion may be formed from multiple helical gear teeth.

In any of the aspects of combinations of the aspects, the gear cooling system may be included in an electric axle that includes a traction motor, a differential, and multiple axle shafts.

In any of the aspects of combinations of the aspects, the electric axle may be included in an all-electric vehicle.

In any of the aspects of combinations of the aspects, the first gear may mesh with a second gear.

In any of the aspects of combinations of the aspects, the first smaller diameter section may include multiple oil channels formed as recesses in an interior surface.

In any of the aspects of combinations of the aspects, the central opening may further include a second smaller diameter section that is positioned at an axial end of the gear and interior to the outer toothed portion of the gear and oil may exit the gear cooling system through the second smaller diameter section.

In any of the aspects of combinations of the aspects, the internal gear cooling system may be included in a gearbox of an electric axle.

In any of the aspects of combinations of the aspects, the first smaller diameter section may include multiple spiral oil channels.

Note that the example control and estimation routines included herein can be used with various engine, powertrain, and/or vehicle system configurations. Further, the control routines may be implemented in other systems which include gears such as industrial machinery, for example. The control methods and routines disclosed herein may be stored as executable instructions in non-transitory memory and may be carried out by the control system including the controller in combination with the various sensors, actuators, and other system hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various hardware components in combination with the electronic controller.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

FIGS. 2-3 are drawn approximately to scale, aside from the schematically depicted components. However, the components may have other relative dimensions in other embodiments.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A gear cooling system comprising:
a spray tube positioned within a central opening that is included in a first gear;
wherein the spray tube includes an oil outlet;
wherein the oil outlet is positioned within a first smaller diameter section of the central opening;
wherein the first smaller diameter section is axially offset from an outer toothed portion of the first gear;
wherein the central opening includes a larger diameter section that is positioned interior to the outer toothed portion of the first gear; and
wherein an axial length of the spray tube is larger than an axial length of the first gear.

2. The gear cooling system of claim 1, wherein the central opening further includes a second smaller diameter section that is positioned at an axial end of the first gear and interior to the outer toothed portion of the first gear.

3. The gear cooling system of claim 1, wherein the spray tube is in fluidic communication with an oil source.

4. The gear cooling system of claim 3, wherein the oil source is an oil pump positioned in a sump of an electric drive.

5. The gear cooling system of claim 1, wherein a diameter of the first smaller diameter section is constant along its axial length.

6. The gear cooling system of claim 1, wherein the central opening further includes an internal ridge, the first smaller diameter section being between the internal ridge and the larger diameter section.

7. The gear cooling system of claim 1, wherein a diameter of the larger diameter section is constant along its axial length.

8. The gear cooling system of claim 1, wherein the outer toothed portion is formed from multiple helical gear teeth.

9. The gear cooling system of claim 1, wherein the gear cooling system is included in an electric axle that includes a traction motor, a differential, and multiple axle shafts.

10. The gear cooling system of claim 9, wherein the electric axle is included in an all-electric vehicle.

11. The gear cooling system of claim 1, wherein the first gear meshes with a second gear.

12. The gear cooling system of claim 1, wherein the first smaller diameter section includes multiple oil channels formed as recesses in an interior surface.

13. A method for operation of a gear cooling system, comprising:
flowing oil to a spray tube from an oil source; and
rotating a gear;
wherein the gear cooling system includes:
the spray tube positioned within a central opening of the gear and including an oil outlet;

wherein the oil outlet is positioned within a first smaller diameter section of the central opening;

wherein the first smaller diameter section is axially offset from an outer toothed portion of the gear;

wherein the central opening includes a larger diameter section that is positioned interior to the outer toothed portion of the gear; and wherein an axial length of the spray tube is larger than an axial length of the gear.

14. The method of claim 13, wherein the central opening further includes a second smaller diameter section that is positioned at an axial end of the gear and interior to the outer toothed portion of the gear and wherein oil exits the gear cooling system through the second smaller diameter section.

15. An internal gear cooling system comprising:

a spray tube positioned within a central opening in a gear;

wherein the spray tube includes an oil outlet;

wherein the oil outlet is positioned within a first smaller diameter section of the central opening;

wherein the first smaller diameter section is axially offset from an outer toothed portion of the gear;

wherein the central opening includes a larger diameter section that is positioned interior to the outer toothed portion of the gear;

wherein the central opening further includes a second smaller diameter section that is positioned at an axial end of the gear and interior to the outer toothed portion of the gear;

wherein oil sequentially flows through the first smaller diameter section, the larger diameter section, and the second smaller diameter section; and wherein an axial length of the spray tube is larger than an axial length of the gear.

16. The internal gear cooling system of claim 15, wherein the internal gear cooling system is included in a gearbox of an electric axle.

17. The internal gear cooling system of claim 15, wherein the first smaller diameter section includes multiple spiral oil channels.

* * * * *